Aug. 27, 1957 L. C. JESTY 2,804,495

COLOR TELEVISON TRANSMITTING SYSTEM

Filed Feb. 6, 1951 2 Sheets-Sheet 1

Inventor:
Leslie Connock Jesty;
By his attorneys,
Baldwin & Wight

Inventor:
Leslie Connock Jesty;
By his attorneys,
Baldwin & Wight

United States Patent Office 2,804,495

Patented Aug. 27, 1957

2,804,495

COLOR TELEVISION TRANSMITTING SYSTEM

Leslie Connock Jesty, Burnham-on-Crouch, England, assignor to Marconi's Wireless Telegraph Company Limited, London, England, a company of Great Britain Application February 6, 1951, Serial No. 209,677

Claims priority, application Great Britain February 28, 1950

4 Claims. (Cl. 178—5.4)

This invention relates to a color television transmitting system and more particularly to such systems of the kind wherein signals are stored electrically and the stored signals scanned to produce a useful signal output.

There are numerous examples of signal systems in which signals are stored, and the stored signals scanned to produce an output consisting of only a selected part of the stored signals. Thus, in a line interlaced television transmitting system employing a storage type of television camera cathode ray tube, signals corresponding to a complete picture are stored on the target of the tube which is then scanned by the cathode ray to develop picture signals, each successive scan taking place in lines which fall in the spaces between the lines of the preceding scan so that, in each scan, only half the target area is explored. The signals in the lines which are traced out in one scan are, of course, "wiped off" but stored signals in the spaces between those lines are not "wiped out" until the next scan. This fact often leads to degradation of picture quality by reason of interference by signals in a line which has not been "wiped off." Such degradation of picture quality is particularly in evidence in interlaced color television systems with color sequences of the field sequential type. In such a system an image in light of one color, e. g. red, is stored on the target and then scanned off in say, odd lines, the next image in, say, green light being stored on the target as the red image is scanned off, the leading edge of the green image following up the moving edge given by successive scanning lines of the red image as the scanning thereof proceeds. Scanning of the green image then takes place in even lines, the leading edge of the next image to be stored (and to be ultimately scanned in odd lines) following up the moving edge given by successive lines of the scanning of the said green image. Thus, scanning of a stored red image in odd lines leaves even red lines not wiped off and signals in those lines interfere with proper storage of the succeeding green image which is to be scanned in even lines. Similarly odd green lines left after scanning a green image in even lines interfere with proper storage of the next image which is to be scanned in odd lines. This type of difficulty arises in systems other than the color system described and is encountered in a number of different television systems, tele-cinematograph systems and also in certain radar systems in which signals are stored for a time in the form of visible light effects produced in a cathode ray tube having a screen with substantial afterglow. For the sake of brevity such systems will be referred to herein as scanned signal storing systems with partial area signal take-off and an important feature of the invention is concerned with eliminating or reducing the above described defect in such systems as at present known.

According to one feature of this invention a scanned signals storing system with partial area signal take-off is characterized in that scanning of all the stored signals is effected but the signal output circuit for signals derived by scanning is gated during scanning so that said circuit is effective only for signals from a predetermined part or parts of the total area scanned. In this way although only the desired signals are fed out via the output circuit, all the stored signals are wiped out during each scanning.

The invention is illustrated in the accompanying drawings which are simplified schematic block diagrams illustrating my invention.

Figure 1:
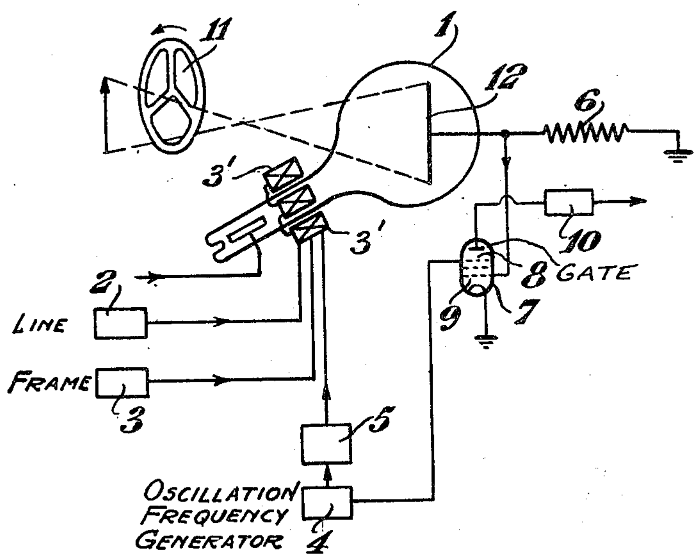
Figure 1 shows the invention applied to a line interlaced color system.

Referring to Fig. 1 which shows a preferred way of carrying out the invention as applied to a line interlaced color system hereinbefore described, the scanning spot in the storage cathode ray tube 1 is given the normal line and field deflection from deflection sources 2, 3 arranged as well known. The line and frame frequencies from the sources 2 and 3 are chosen in accordance with well known principles to insure interlaced scanning. In a line interlaced scanning system, the target is first scanned in alternate lines, intermediate lines being skipped, and is then scanned a second time in the intermediate lines; a complete scan of the image is effected in two scans of the target. To this end, the field deflection source provides an appropriately steep deflection wave for application to the field deflection members 3'. This is known art. In addition, the scanning spot is given a supplementary deflection in a direction at right angles, or substantially at right angles to the line direction, constituted by an oscillating deflection with an amplitude substantially equal to the line width and at a frequency at least equal to the picture point frequency and preferably several times the picture point frequency. Preferably this oscillating deflection is of square wave form but a reasonably good result is obtainable by using an oscillation with a wave form consisting of a wave plus the third harmonic. In Fig. 1 this oscillating deflection is obtained from a source 4 through a shaping circuit 5 and is superimposed on the field deflection. Any harmonic suitable for producing a square wave, or approximately square wave, that is, through a saturated transformer, may be developed from the oscillations generated at 4 and delivered to the shaping circuit in block 5. Whatever form of oscillation is used it will be seen that, during any one line period, the cathode ray scanning spot oscillates at high frequency between the line from which signals are to be taken off and the next line from which signals are not required until the next scan. The beam deflection at right angles to the line direction should be carried out at a frequency that is sufficiently high to ensure that substantially the whole line area is scanned by the beam. Accordingly the whole target area is scanned each time and all the signals are wiped off. In order, however to take off only the signals that are required, the output signals which are set up across the load resistance 6 are "gated" by a gate controlled by or synchronized with the additional deflection oscillation of the spot so that the gate is "open" only when the spot is "sampling" the signals stored in the lines required to be scanned in the scan for the time being in operation. The gate may conveniently be and is illustrated as constituted by a simple multi-grid amplifier 7 with one of its grids 8 controlled between the cut-off and the conductive control conditions by an alternating voltage wave component derived from the alternating voltage source 4 used to oscillate the spot and another grid 9 serving as an input grid for signals from resistance 6. The gated signal output is passed through a low pass filter 10 having its cut-off frequency high enough to pass all the desired picture frequencies but below the spot oscillation frequency. In this way what may be termed the "sampling frequency" may be eliminated from said signals. In Fig. 1, which, as stated, is purely schematic the disc 11 represents the color filter mechanism and plate 12 the storage electrode of the tube 1. The function of the disc 11 is to change the color of the light image stored on plate 12 in successive scans.

Figure 2:
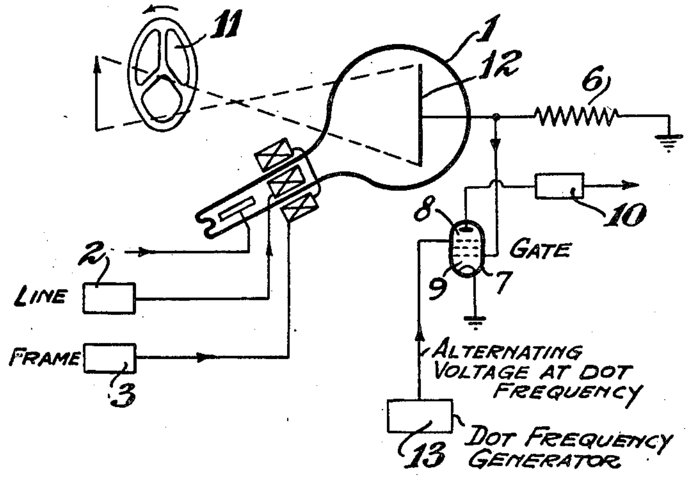
Fig. 2 shows the invention applied to a dot interlaced color system.

Fig. 2 shows the invention applied to dot interlaced sequential color field television systems. In a simple dot interlaced scanning system, the whole target is first scanned line-by-line, that is without intermediate lines being skipped, and useful signal is taken from alternate small areas (dots) in each line, no signal being taken from the intermediate dots, and the whole target is then scanned a second time, useful signal being taken from the intermediate dots but not from the dots from which useful signal was taken during the previous scan. In applying the present invention to such a system the spot in the storage tube is not oscillated, as in Fig. 1, but scans the lines directly one after another. For this purpose, the field deflection source is arranged to produce an appropriately sloped output to produce line-by-line scanning. This is known art. The dot frequency from the generator 13 is chosen to be an odd multiple of half the line frequency from the line source 2. The output circuit contains a gate and filter like the elements 7 to 10 of Fig. 1 but the gate is "opened" for alternate half waves of the dot frequency so that the required signals only would be sampled or taken. For this purpose the dot frequency is fed to the grid 8, the units 4 and 5 of Fig. 1 being omitted. The wave form of the dot frequency as fed to control the gate is preferably square but might be sinusoidal or, better, sinusoidal plus third harmonic.

Figure 3:
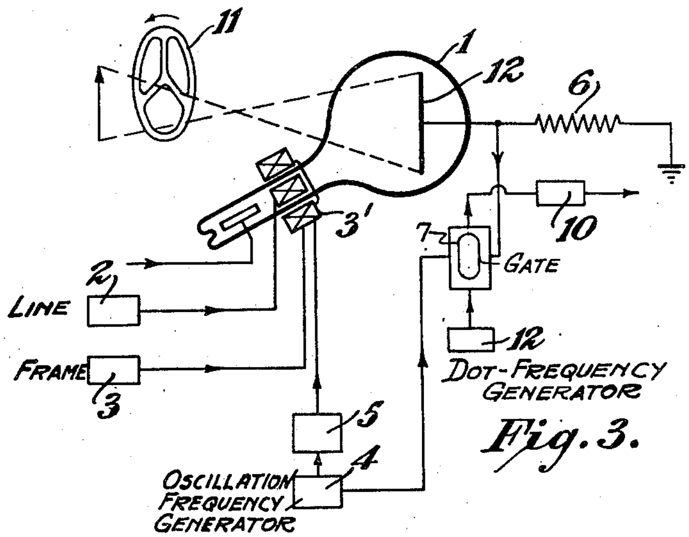
Fig. 3 shows the invention applied to dot and line interlaced color system.

This feature of the invention is similarly applicable to systems with dot and line interlacing. In interlaced dot and line scanning, the target is first scanned in alternate lines, as in Fig. 1, intermediate lines being skipped, and useful signal is taken from alternate dots in these scanned lines. The target is then scanned a second time in intermediate lines, the lines previously scanned being skipped, useful signal being taken from alternate dots in these lines. The target is then scanned a third time in alternate lines (that is in the lines scanned during the first scan) and useful signal is taken from the intermediate dots which were skipped during the first scan. Finally the target is scanned for a fourth time in intermediate lines (that is in the lines scanned during the second scan) and useful signal is taken from the intermediate dots which were skipped during the second scan. In such a case the scanning spot is given an oscillating deflection as in Fig. 3 by the application of a high-frequency oscillation from oscillation-frequency generator 4. A gate and filter arrangement including the elements 7 to 10 is provided and the gate in the signal output circuit is subject to joint control by the oscillation frequency (from unit 4) and the dot frequency generator 12 so that only the desired signals from the dots in the scan for the time being in operation are passed. Although the system is in fact operative without synchronization, nevertheless, synchronization may be employed between the oscillations developed from oscillation-frequency generator 4 and oscillations developed from the dot frequency generator 12.

It will be noted that in all cases of television transmitters employing this invention, no modification to cooperating receivers is required.

I claim:

1. A color television or color telecinematograph system in which a plurality of color component images are stored in succession upon a storage electrode independent of unwanted image components and in which during each scanning all the stored image is wiped out and only the desired signals are fed out via the output circuit, comprising means for scanning the whole of each successively stored color component image, a signal output circuit connected to said storage electrode, means comprising an electron discharge tube fed with the output from the storage electrode for gating said circuit during scanning of each stored color component image so as to render said output circuit operative only for signals from predetermined portions of the total area scanned, the portions being different fo reach color component image, and means connected between said gating means and said output circuit for passing all the desired image components while blocking the unwanted image components.

2. A color television or color telecinematograph system as set forth in claim 1 wherein the desired signals are signals from spaced interlaced lines, including means for oscillating at a high frequency the scanning spot between a line from which signals are to be taken out during one scan and the next line from which signals are not required until the next scan, said means rendering said gating means operative only when the scanning spot is on said line from which signals are to be taken out.

3. A color television or color telecinematograph system as set forth in claim 1 wherein each line is scanned during each complete scan of said electrode and the desired signals are signals from spaced interlaced dots in each scanned line, said means for rendering the means for gating said circuit operative at the dot frequency operating only when the scanning spot is on dots from which during the said complete scan signals are to be taken out.

4. A color television or color telecinematograph system as set forth in claim 1 wherein the desired signals are signals from spaced interlaced dots in spaced interlaced lines, said means for oscillating the scanning spot between a line from dots in which signals are to be taken out during one scan and the next line from which signals are not required until the next scan, said means rendering the means for gating said circuit operative only when the scanning spot is on a dot from which signals are to be taken out.

References Cited in the file of this patent

UNITED STATES PATENTS

| | | |
|---|---|---|
| 2,093,157 | Nakashima | Sept. 14, 1937 |
| 2,143,933 | Barthelemy | Jan. 17, 1939 |
| 2,222,934 | Blumlein | Nov. 26, 1940 |
| 2,479,880 | Toulon | Aug. 23, 1949 |

FOREIGN PATENTS

| | | |
|---|---|---|
| 114,048 | Australia | Oct. 14, 1941 |
| 546,462 | Great Britain | July 15, 1942 |